US011275257B2

(12) United States Patent
Lowe

(10) Patent No.: US 11,275,257 B2
(45) Date of Patent: Mar. 15, 2022

(54) APPARATUS FOR RETRACTABLE TETHERING AND ATTACHMENT TO AND BETWEEN HEADGEAR AND EYEWEAR AND METHODS OF MAKING AND USING THE SAME

(71) Applicant: Matthew W. Lowe, Lufkin, TX (US)

(72) Inventor: Matthew W. Lowe, Lufkin, TX (US)

( * ) Notice: Subject to any disclaimer, the term of this patent is extended or adjusted under 35 U.S.C. 154(b) by 0 days.

(21) Appl. No.: 16/148,547

(22) Filed: Oct. 1, 2018

(65) Prior Publication Data
US 2019/0101772 A1 Apr. 4, 2019

Related U.S. Application Data

(60) Provisional application No. 62/567,002, filed on Oct. 2, 2017.

(51) Int. Cl.
*G02C 3/02* (2006.01)
*A42B 1/247* (2021.01)
*G02C 3/00* (2006.01)

(52) U.S. Cl.
CPC ............. *G02C 3/02* (2013.01); *A42B 1/247* (2013.01); *G02C 3/006* (2013.01); *G02C 2200/02* (2013.01); *G02C 2200/24* (2013.01)

(58) Field of Classification Search
CPC ....... G02C 11/02; G02C 2200/02; G02C 3/02
USPC ................ 351/155, 120; 2/10, 209.12, 195.1
See application file for complete search history.

(56) References Cited

U.S. PATENT DOCUMENTS

| 6,644,807 | B1 * | 11/2003 | Hood | A42B 1/247 2/10 |
| 7,255,436 | B2 * | 8/2007 | Tracy | A42B 1/247 2/209.13 |
| 2005/0117111 | A1 * | 6/2005 | Bruck | G02C 5/2263 351/120 |
| 2014/0063443 | A1 * | 3/2014 | Berger | A42B 1/247 351/155 |

OTHER PUBLICATIONS

Filing receipt and specification for provisional patent application entitled "Apparatus for Retractable Tethering and Attachment to and Between Headgear and Eyewear and Methods of Making and Using the Same," by Matthew W. Lowe, filed Oct. 2, 2017 as U.S. Appl. No. 62/567,002.

* cited by examiner

*Primary Examiner* — Hung X Dang
(74) *Attorney, Agent, or Firm* — Jerry C. Harris, Jr.

(57) ABSTRACT

Embodiments of the disclosure include an integrated eyewear and headgear system, including retrofitting existing headgear and eyewear, allowing the eyewear to remain attached, affixed to, or connected with headgear while not in use (not covering the eyes), as well as when in use (covering the eyes). A headgear and eyewear system may comprise eyewear configured to be worn on the face of a user; headgear configured to be worn on the head of the user; and at least one retaining mechanism configured to attach the eyewear to the headgear, wherein the eyewear comprises a first position in front of the user's eyes, wherein the eyewear comprises a second position upon the headgear and not in front of the user's eyes, and wherein the retaining mechanism is configured to retain the eyewear with respect to the headgear in at least one of the first position and the second position.

14 Claims, 5 Drawing Sheets

APPARATUS FOR RETRACTABLE TETHERING AND ATTACHMENT TO AND BETWEEN HEADGEAR AND EYEWEAR AND METHODS OF MAKING AND USING THE SAME

CROSS-REFERENCE TO RELATED APPLICATIONS

The present application claims priority to U.S. Provisional Patent Application Ser. No. 62/567,002 filed Oct. 2, 2017 by Matthew W. Lowe and entitled "Apparatus for Retractable Tethering and Attachment to and between Headgear and Eyewear and Methods of Making and Using the Same" which is incorporated herein by reference as if reproduced in its entirety.

BACKGROUND OF THE INVENTION

This invention relates generally to the integration of eyewear and headgear. This invention allows the attachment and/or continuous connection of eyewear and headgear as the eyewear is moved between use covering the eyes and in storage in, on, or about the headgear by means of an attachable, detachable retractable or magnetic mechanism. Retractable reel mechanisms are common in other applications such as connecting identification badges, fishing equipment or key attachments. However, the use of retractable reels has not been utilized as a means of integrating and connecting eyewear with headgear. Integrating retractable mechanisms with eyewear and headgear increases comfort, security of the eyewear, and efficiency for the wearer. In an embodiment, the eyewear (i.e., sunglasses) might be retractably tethered and attached to a fisherman's or baseball cap, a soldier or construction worker's helmet or hard hat (safety glasses), allowing the glasses to be removed from a position in front of the eyes and placed upon the headgear while remaining attached to the headgear in a position not in front of the eyes.

SUMMARY OF THE INVENTION

Eyewear such as sunglasses are commonly stored above the brim of caps or other headgear when not in use. This often leads to the eyewear falling from its position upon the headgear causing loss or damage of the eyewear. The current invention applies to the design and use of micro retractable reel technology to attach and integrate eyewear and headgear, to allow the eyewear to remain connected to the headgear via the retractable mechanism or magnetic attraction as the wearer moves the eyewear from the location of the face to a location upon the headgear. It also includes headgear and eyewear with integrated magnets, magnetizable materials allowing eyewear to remain attached to and/or connected with to the headgear while not in use (not covering the eyes), as well as when in use (covering the eyes).

The retractable mechanism or magnetic attraction allows the retractable tethering cord or magnetic attraction to hold constant tension between the eyewear and headgear. Included in the invention is specific eyewear and headgear designed for such integration to include the attachment mechanism, the headgear and eyewear, and means of attachment of the retractable or magnetic apparatus.

The eyewear may be integrated with the headgear by means of a micro retractable reel or magnetic attraction via a permanent, semi-permanent or detachable mechanism allowing the eyewear, once removed from the eyes, to remain attached and/or stored upon the headgear in a position not in front of the eyes. The headgear may be designed with an integrated or attachable or detachable micro-reel tethering or magnetic device, including an attachment mechanisms to accept a permanent or non-permanent detachable retractable tethering device or magnetic device permanently or non-permanently attached, clipped or and/or tethered to the eyewear and or headgear.

In an embodiment, the apparatus may be attached to the headgear and eyewear by a physical or magnetic attraction, and attached to an extendable, retractable apparatus in a strategic location to facilitate freedom of movement of the eyewear to and from a position in front of the eyes as needed, and to be stored and attached to the headgear or headgear elements when not in use covering the eyes.

In one embodiment, a headgear and eyewear system may comprise eyewear configured to be worn on the face of a user (e.g., eyewear which can remain in a predominantly stationary position such that the user's field of view is affected by, and/or through, the eyewear's lens or lenses); headgear configured to be worn on the head of the user (e.g., headgear which can remain in a predominantly stationary position on and/or about a user's head); and at least one retaining mechanism configured to attach the eyewear to the headgear, wherein the eyewear comprises a first position in front of the user's eyes, wherein the eyewear comprises a second position upon the headgear and not in front of the user's eyes, and wherein the retaining mechanism is configured to retain the eyewear with respect to the headgear in at least one of the first position and the second position.

In one embodiment, a retaining mechanism configured to attach to eyewear and headgear may comprise a retractable tethering device attached to the headgear, configured to maintain a connection between the headgear and the eyewear; and an attachment mechanism attached to the eyewear configured to attach to at least a portion of the retractable tethering device, wherein the eyewear comprises a first position in front of the user's eyes; wherein the eyewear comprises a second position upon the headgear and not in front of the user's eyes; and wherein the retaining mechanism is configured to retain the eyewear with respect to the headgear in at least one of the first position and the second position.

In one embodiment, a method for retaining eyewear with respect to headgear may comprise attaching a retaining mechanism to at least one of the headgear and the eyewear; incorporating an attachment mechanism of the retaining mechanism into at least one of the headgear and the eyewear; and retaining the eyewear with respect to the headgear via the retaining mechanism when the eyewear is in at least one of a first position in front of the user's eyes and a second position upon the headgear and not in front of the user's eyes.

DETAILED DESCRIPTION

Eyewear, particularly sunglasses, may be frequently removed by the wearer and placed upon or about the head or headgear (such as a baseball cap, etc.), for example when coming indoors to avoid the darkness associated with indoor lighting or during low-light conditions associated with outdoor activities. The current disclosure includes the design and use of one or more micro retractable reel and/or magnetic devices to integrate eyewear and headgear. Embodiments may include retrofitting existing headgear and eyewear as well as headgear and eyewear designed specifically for the use of such a device or system allowing the eyewear to remain attached, affixed to, or connected with headgear while not in use (e.g., not covering the eyes and/or not affecting a user's field of view), as well as when in use (e.g., covering the eyes and/or affecting a user's field of view). This disclosure includes a system comprising headgear and eyewear, as well as a retaining mechanism (e.g., a permanent or non-permanent attachable, detachable, retractable tethering or magnetic device) configured to connect eyewear and headgear. This disclosure may also include an adjustable attachment mechanism connecting the retaining mechanism (e.g., the tethering or magnetic device) to eyewear and/or headgear.

Figure 1:
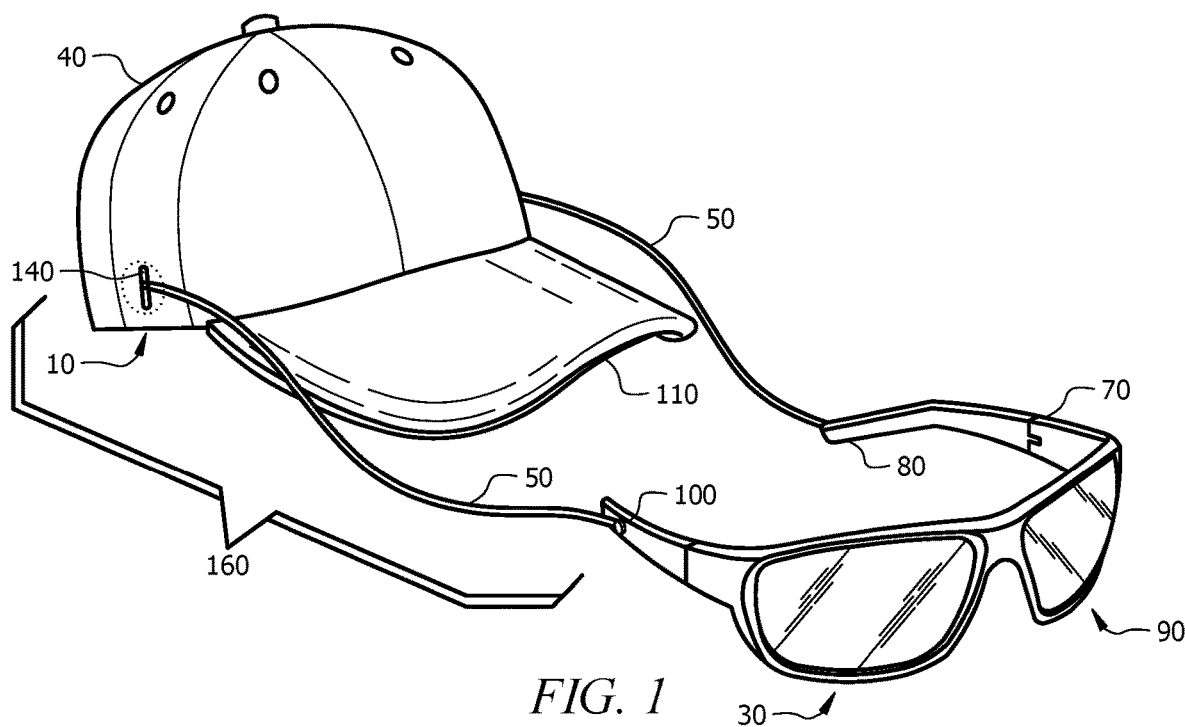
FIG. 1 represents an embodiment of the present disclosure wherein eyewear is tethered to headgear.

As shown in FIG. 1, headgear 40 and/or eyewear 30 may comprise a retaining mechanism 160 configured to adjustably connect the headgear 40 to the eyewear 30. In the embodiment shown in FIG. 1, the retaining mechanism 160 may comprise a retractable tethering device 10 and an attachment mechanism 100. The retractable tethering device 10 (which may comprise a micro retractable reel) may be attached to the interior of the headgear 40, wherein one or more tethers 50 of the retractable tethering device 10 may pass through portals or eyelets 140 from the interior to the exterior of the headgear 40 and the tethers may connect with the attachment mechanism 100 and/or directly to the eyewear 30. The attachment mechanism 100 may generically refer to any type of clip, snap, pin, screw mechanism, swivel, nut, bolt, clamp, compression-based mechanism, ball and socket connector, magnet, ferrous, ferromagnetic, magnetizable material, friction-based fastener, gear, zipper, plug, hook and loop, hook and eye, hook, hoop, spring, spring-loaded device, tie, knot, winding mechanism, tongue and groove, glue, adhesive, tape, embroidery, weld, or other connection that facilitates the attachment and connection between the eyewear 30 and the headgear 40. The retractable tethering device 10 allows the eyewear 30 to remain continuously attached to the headgear 40 via the extendable and retractable tether(s) 50 of the retractable tethering device 10. For example, the eyewear 30 may remain connected to the headgear 40 as the eyewear 30 is moved between a first position in front of the user's eyes and a second position upon the headgear 40 not in front of the user's eyes (i.e., above a brim 110 of the headgear 40). The spring-loaded tension created by the retractable tethering device 10 holds the eyewear 30 in place in a position in front of the eyes (in the first position) and on the headgear 40 not in front of the eyes (in the second position) and may also allow the headgear 40 to be removed from the head and the eyewear 30 remain attached to the headgear 40.

As shown in FIG. 1, the eyewear 30 may comprise one or more lenses 90 configured to fit in front of the eyes of the user. The eyewear 30 may comprise one or more eyewear temples 70 configured to extend from the lenses 90 along the face of the user. The eyewear 30 may also comprise one or more earpieces 80 at the end of the temples 70 configured to fit on and/or around the ears of a user.

Figure 2:
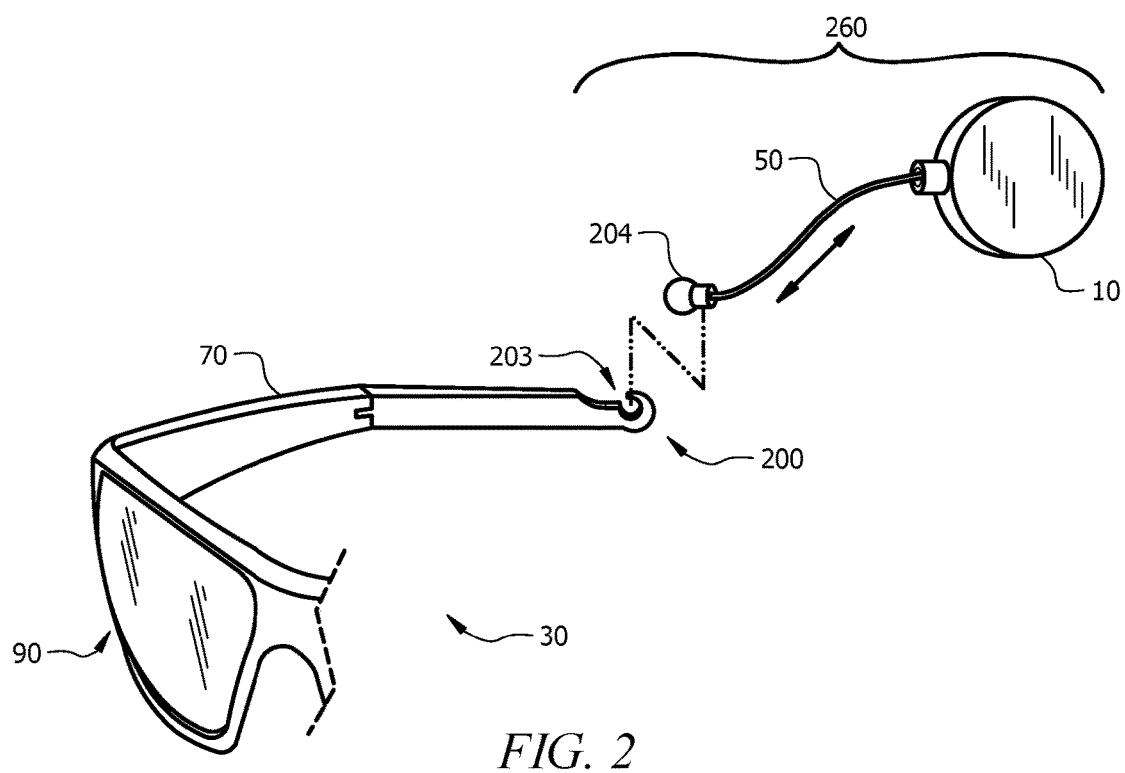
FIG. 2 represents an embodiment of the present disclosure wherein eyewear is tethered to headgear comprising a ball and socket component.

As shown in FIG. 2, headgear 40 and/or eyewear 30 may comprise a retaining mechanism 260 configured to adjustably connect the headgear 40 to the eyewear 30. The eyewear temple 70 may comprise an attachment mechanism 200 that incorporate a socket 203 into which a ball (or ball-like structure) 204 may be affixed, wherein the ball 204 may be attached to a tether 50 of the retractable tethering device 10. For example, on a truncated temple 70 (i.e., a temple 70 without an earpiece 80 as shown in FIG. 1), the spring-loaded tension created by the retractable tethering device 10 holds the eyewear 30 in place in a position in front of the eyes and a position on the headgear 40 not in front of the eyes. On the truncated temple 70 shown in FIG. 2, the ball (or ball-like structure) 204 attached tether 50 of the retractable tethering device 10 may be configured to swivel within the socket 203 to allow the tether 50 to move above, below, and parallel with the level of the temple 70 as the eyewear 30 is moved to positions in front of the eyes and on the headgear 40 in positions not in front of the eyes. In another example, a plurality of socket(s) 203 may be molded into the eyewear temples 70 at multiple locations along the temple 70 to allow attachment of the ball 204 of the tethers 50 of the retractable tethering device 10 at one of multiple locations on the temple 70, allowing a user to adjust the effective length of the tether 50 and adjust the distance between the lenses 90 and eyes. The ball 204 and socket 203 configuration may allow the tethers 50 of the retractable tethering device 10 to swivel above and below the temples 70 as the eyewear 30 is moved to positions in front of the eyes and upon the headgear 40 in positions not in front of the eyes. The spring-loaded tension created by the retractable tethering device 10 holds the eyewear 30 in place in a position in front of the eyes and a position on the headgear 40 not in front of the eyes and allows the headgear 40 to be removed from the head and the eyewear remain attached to the headgear 40.

Figure 3:
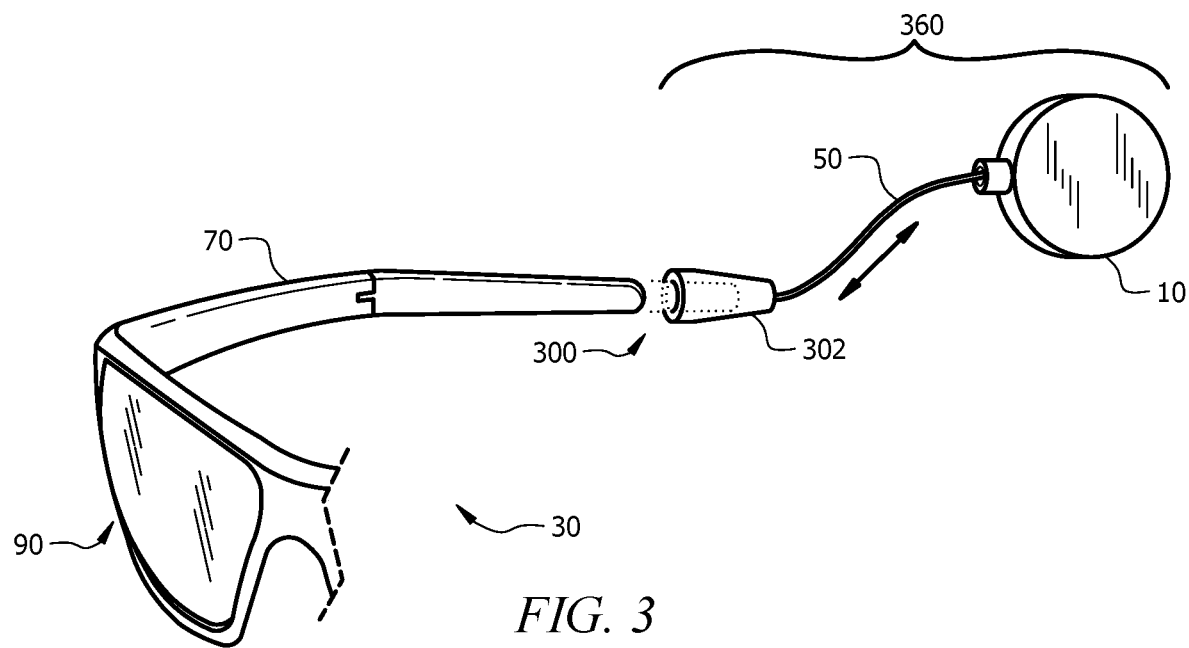
FIG. 3 represents an embodiment of the present disclosure wherein eyewear is tethered to headgear comprising a compression based component.

As shown in FIG. 3, headgear 40 and/or eyewear 30 may comprise a retaining mechanism 360 configured to adjustably connect the headgear 40 to the eyewear 30. In an embodiment, attachment mechanism 300 may comprise a rubberized compression structure 302 which may be attached to the external ends of the tether 50 of the retractable tethering device 10. An opening in the rubberized compression structure 302 may allow for insertion of the eyewear earpiece 80 and/or temple 70 and may be expandable to supply compressive tension (force) upon the inserted eyewear earpiece 80 or temple 70 adequate to connect and hold the eyewear 30 securely to the tether 50 of the retractable tethering device 10. The spring-loaded tension created by the retractable tethering device 10 holds the eyewear 30 in place in a position in front of the eyes and a position on the headgear 40 not in front of the eyes and allows the headgear 40 to be removed from the head and the eyewear 30 remain attached to the headgear 40.

Figure 4:
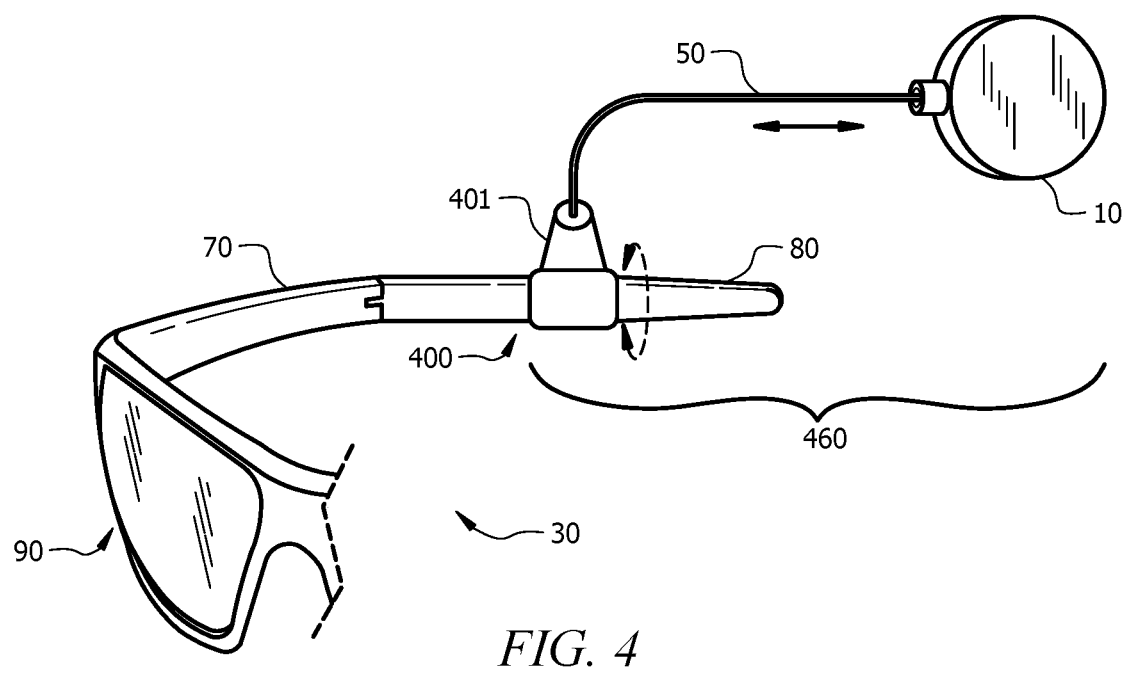
FIG. 4 represents an embodiment of the present disclosure wherein eyewear is tethered to headgear comprising a swivel-based component.

As shown in FIG. 4, headgear 40 and/or eyewear 30 may comprise a retaining mechanism 460 configured to adjustably connect the headgear 40 to the eyewear 30. An attachment mechanism 400 may comprise a swivel device 401 attached to external end the tether temple 70 and/or earpiece 80. The swivel device 401 allows the tether 50 of the retractable tethering device 10 to be connected to full-length temple eyewear and allow the tether 50 of the retractable tethering device 10 to rotate above and below the temple 70 or earpiece 80 so that the tether 50 of the retractable tethering device 10 does not impede or become tangled with the eyewear temple 70 or earpiece 80 as the eyewear 30 is moved from a position in front of the eyes to a position upon the headgear 40 not in front of the eyes.

Figure 5:
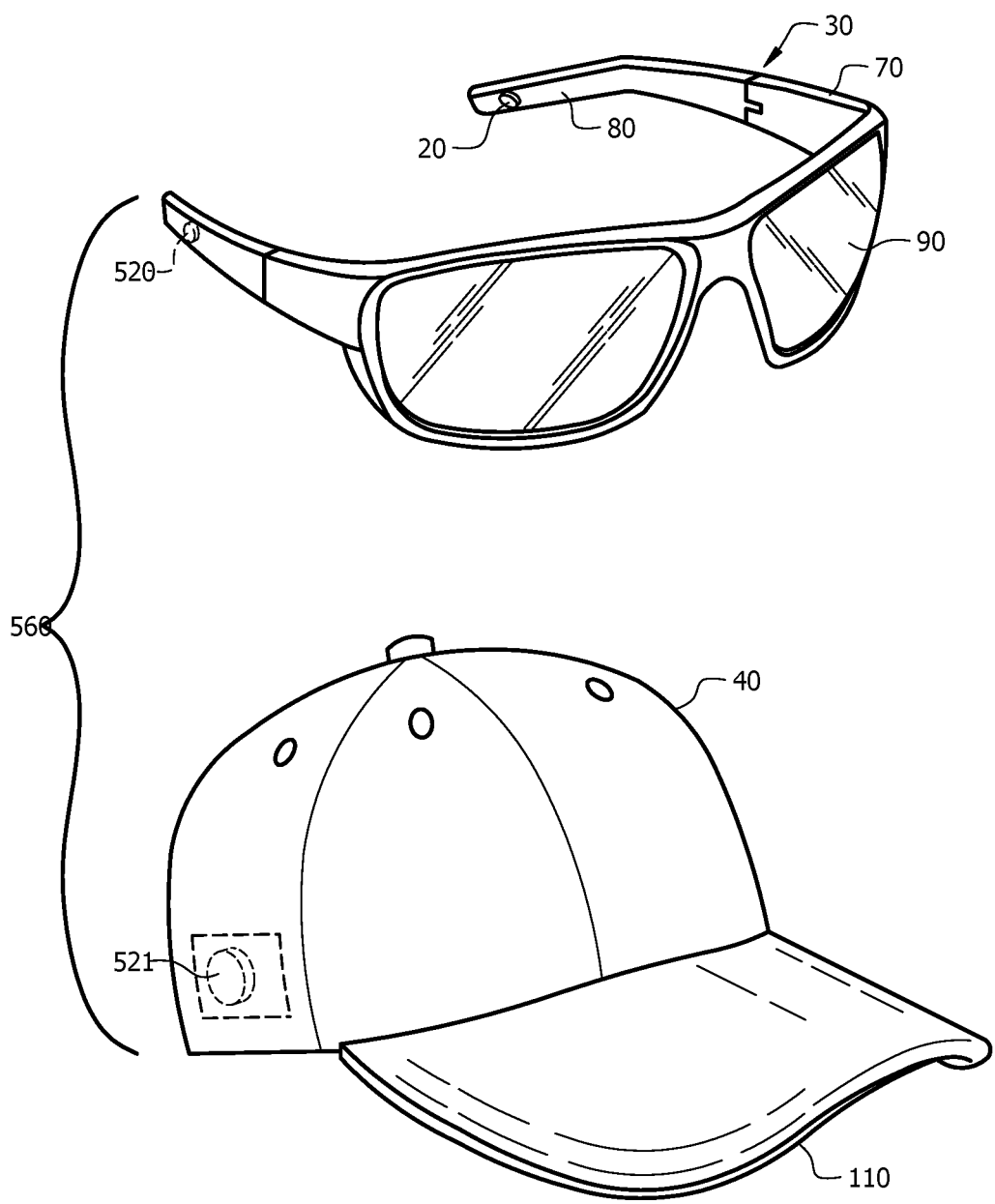
FIG. 5 represents an embodiment of the present disclosure wherein eyewear is tethered to directly to headgear comprising a magnetic component.

As shown in FIG. 5, headgear 40 and/or eyewear 30 may comprise a retaining mechanism 560 configured to adjustably connect the headgear 40 to the eyewear 30. Retaining mechanism 560 may comprise a first magnetic coupling component 520 (e.g., a magnetic, ferrous, ferromagnetic, or magnetizable material) integrated into the temple 70 and/or earpiece 80 of the eyewear 30. The retaining mechanism 560 may also comprise a second magnetic coupling component 521 (e.g., a magnetic, ferrous, ferromagnetic, or magnetizable material) integrated into the internal side of the headgear 40, for example between the headband and side panel, in positions and locations to correspond to the first magnetic coupling component 520 within the eyewear 30. When referencing "a first magnetic coupling component 520 (e.g., a magnetic, ferrous, ferromagnetic, or magnetizable material)" and "a second magnetic coupling component 521 (e.g., a magnetic, ferrous, ferromagnetic, or magnetizable material)" it is understood at least one of the "first magnetic coupling component 520" and "second magnetic coupling component 521," when present in a combination, will comprise a magnet. In other words, one or both of eyewear 30 and headgear 40 may comprise a magnet (i.e., either or both magnetic coupling components 520 and 521 may be a magnet) to facilitate a magnetic coupling between the eyewear 30 and headgear 40. Similarly, when one of eyewear 30 and headgear 40 comprises a magnet, the other of the eyewear 30 and headgear 40 may comprise a component which may be influenced by a magnetic attractive force of a magnet to facilitate a magnetic coupling between the first magnetic coupling component 520 and the second magnetic coupling component 521. The magnetic attraction between the first magnetic coupling component 520 in the eyewear 30 and the second magnetic coupling component 521 in the headgear 40 may create an attractive force that may allow the eyewear 30 to be "fastened" or "coupled" to the headgear 40 when not use in a position in front of the eyes, for example above the brim 110 of a the headgear 40.

Figure 6:
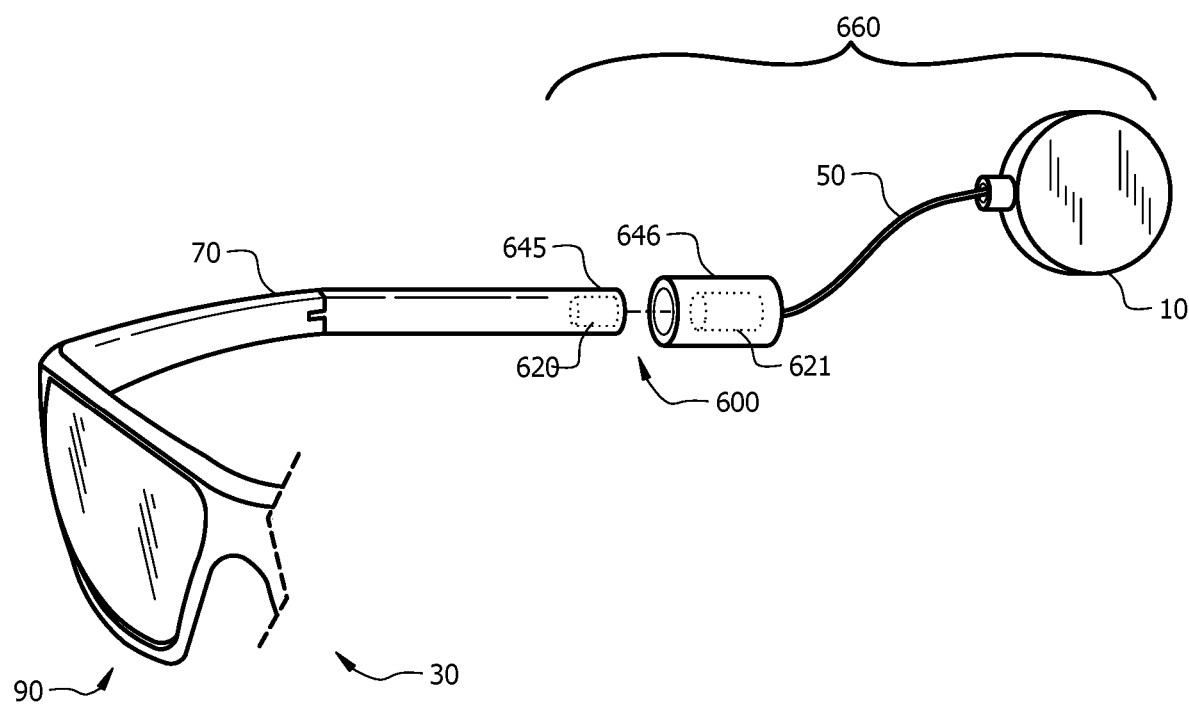
FIG. 6 represents an embodiment of the present disclosure wherein eyewear is tethered to headgear via a magnetic coupling between the eyewear and a tethering component.

As shown in FIG. 6, headgear 40 and/or eyewear 30 may comprise a retaining mechanism 660 configured to adjustably connect the headgear 40 to the eyewear 30. An attachment mechanism 600 may comprise a first magnetic attachment component 620 (e.g., a magnetic, ferrous, ferromagnetic, or magnetizable material) incorporated into the the eyewear 30 which may couple (or engage, link, affix, connect) to a corresponding a second magnetic attachment component 621 (e.g., a magnetic, ferrous, ferromagnetic, or magnetizable material) affixed to the end of the tether 50 of the retractable tethering device 10. For example, one or both of magnetic attachment components 620 and 621 may be located inside one or more rubberized or synthetic sleeves 646, 645 located on the end of the tether 50 of the retractable tethering device 10 and/or the eyewear 30. The magnetic attraction between the magnetic attachment components 620 and 621 connects the tether 50 of the retractable tethering device 10 to the eyewear 30, allowing the tether 50 to retain a connection between the eyewear 30 and headgear 40.

When referencing "a first magnetic attachment component 620" and "a second magnetic attachment component 621" it is understood at least one of the "first magnetic attachment component 620" and "second magnetic attachment component 621," when present in a combination, will comprise a magnet. In other words, one or both of eyewear 30 and tether 50 comprises a magnet (i.e., either or both magnetic attachment components 620 and 621 may be a magnet) to facilitate a magnetic coupling between the eyewear 30 tether 50. Similarly, when one of eyewear 30 and tether 50 comprises a magnet, the other of the eyewear 30 and tether 50 may comprise a component which may be influenced by a magnetic attractive force of a magnet to facilitate a magnetic coupling between the first magnetic attachment component 620 and the second magnetic attachment component 621. The magnetic attraction between the first magnetic attachment component 620 in the eyewear 30 and the second magnetic attachment component 621 of the tether 50 may create an attractive force that may allow the eyewear 30 to be "fastened" or "coupled" to the tether 50.

For example, the connection between the magnetic attachment components 620 and 621, may occur inside a sleeves 645 and 646. The spring-loaded tension created by the retractable tethering device 10 holds the eyewear 30 in place in a position in front of the eyes and a position on the headgear 40 not in front of the eyes and allows the headgear 40 to be removed from the head and the eyewear 30 remain attached to the headgear 40.

Figure 7:
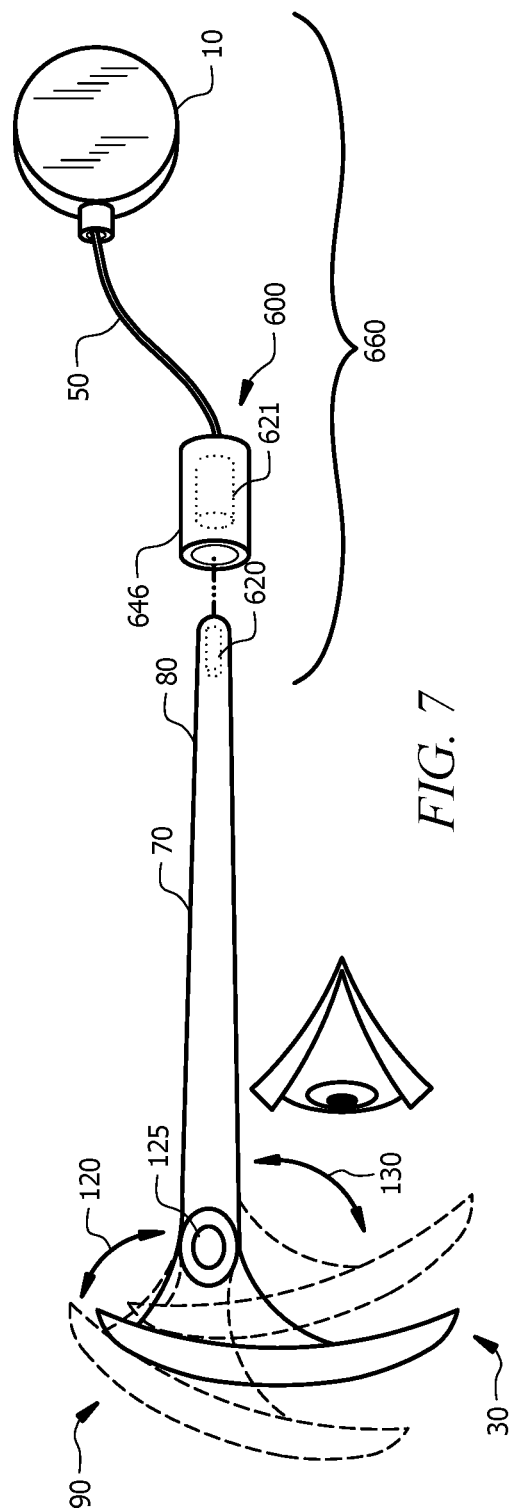
FIG. 7 represents an embodiment of the present disclosure wherein lens to temple angle and the lens angle is adjustable.

As shown in FIG. 7, a ratchet mechanism 125 positioned between the lens 90 and the temple 70 of the eyewear 30 may allow a lens-temple angle 120 to be adjusted, allowing the eyewear 30 to rest at a wearer-selected area upon the nose or in front of the eyes while the temple 70 is positioned at one of multiple locations upon the headgear 40 or head at the discretion of the wearer. The ratchet mechanism 125 may allow an adjustable eye-eyewear relationship (i.e., lens angle 130) while allowing the temple 70 to rest upon the head or headgear 40 at a desired but adjustable position.

In an embodiment, the eyewear 30 may be designed to be integrated with, attached, or attachable to a retaining mechanism to accept a permanent or non-permanent detachable retractable tethering or magnetic device permanently or non-permanently attached, attachable to, connected with, clipped to, magnetized to, between, in, or upon the eyewear 30 and/or headgear 40 allowing the eyewear 30 to be removed from a position in front of the eyes, to a position not in front of the eyes, while remaining attached, fastened to, connected within, and/or stored upon, in, or about the headgear 40 or headgear components.

In an embodiment, headgear 40 may include, but is not limited to hats, caps, visors, helmets, facemasks, hardhats, bump caps, earphones, earmuffs, ear plugs, toboggans, doorags, headbands, combat gear, personal protective equipment, goggles, hair bands, hair clips, eyewear tethers, hoods, and bows.

In an embodiment, the headgear 40 may be designed to be integrated with, attached, or attachable to a micro-reel retractable tethering device 10, one or more magnetic components, and/or an attachment mechanism to accept a permanent or non-permanent detachable retractable tethering or magnetic device permanently or non-permanently attached, or attachable to, connected with, clipped to, magnetized to, between, in or upon the eyewear 30 and/or headgear 40 allowing the eyewear 30, once removed from a position in front of the eyes, to be securely and efficiently attached, fastened to, connected with, stored upon, in, or adjacent to the headgear 40.

In an embodiment, one or more apparatus (as described above) may be attached to the headgear 40 and eyewear 30 at strategic locations to facilitate freedom of movement of the eyewear 30 to and from a position in front of the eyes, at the convenience of the wearer, to be stored while remaining attached to the headgear 40 when not in use.

In an embodiment, eyewear 30 and headgear 40 may be connected to, and connected to each other by, a retractable tethering device 10 allowing movement of eyewear 30 from a position in front of the eyes to a position upon the headgear while maintaining a continuous connection and attachment between the eyewear 30 and headgear 40. The attachment mechanism may be integrated with the retractable tethering device 10, attachable to eyewear 30 and headgear 40 and adjustable to fit multiple-sized eyewear 30, headgear 40, and wearers.

In another embodiment, eyewear 30 and headgear 40 may incorporate one or more magnetic components 520, 521 to allow eyewear 30 to be magnetically attached to and connected with headgear 40 when not in use in a position in front of the eyes.

In another embodiment, an attachment mechanism, eyewear 30, headgear 40 and connection device may be adjustable to facilitate different size eyewear 30 and headgear 40 to ensure that eyewear 30 and headgear 40 integration can be adjustable to fit variable size wearers.

In an embodiment, specifically designed eyewear 30 and headgear device may be connectable to each other by a retractable tethering device or mechanism 10 and an attachment mechanism allowing movement of eyewear 30 from eyes to headgear 40 while remaining connected to the headgear 40.

In an embodiment, a permanent or non-permanent attachable, detachable retractable tethering or magnetic device may be retrofitable (i.e., able to be retrofit onto existing eyewear and headgear), and swivel to positions above and below the temple 70 or earpiece 80 to allow movement of eyewear 30 between a position in front of the eyes and one of storage upon, or about the headgear 40 when eyewear 30 is not in use.

In an embodiment, eyewear temple 70, earpiece 80, and/or lenses 90 may have multiple connection points to allow adjustment of tethering and/or magnetic components and allow the distance between the connected eyewear 30 and the eyes to be adjustable.

In an embodiment, the attachment mechanism and/or connection device may swivel, rotate, flip, revolve, pivot, spin, turn, or move in such a manner to allow eyewear 30 and/or headgear 40 to accept a permanent or non-permanent detachable retractable tethering or magnetic device permanently or non-permanently attached, or attachable to, connected with, clipped to, magnetized to, between, in or upon the eyewear 30 and/or headgear 40 allowing the eyewear 30, once removed from a position in front of the eyes, to be securely and efficiently attached, fastened to, connected with or stored upon, in or adjacent to the headgear 40.

An embodiment of the disclosure may comprise an adjustable, attachable, detachable, magnetic or permanent retractable apparatus that connects to, between, tethers 50 or otherwise integrates eyewear 30 and/or eyewear components with headgear 40 and/or headgear components allowing an extendable and retractable and continual or periodic tension-supported or magnetic connection between eyewear 30 or eyewear components and/or headgear 40 and/or headgear components. In an embodiment, the apparatus includes specifically designed eyewear 30, eyewear elements, headgear 40, or headgear elements adjustable, attachable and detachable to a retractable mechanism (e.g., retractable tethering device 10) or magnetic components (e.g., 520 and 521) via an attachment mechanism, including the retractable tethering device or mechanism 10 within or integrated with, magnetized to, incorporated with, within, upon, onto, into, or attachable or detachable to eyewear 30 and headgear 40. In an embodiment, the apparatus includes specifically designed headgear and/or headgear components adjustable, attachable and detachable to eyewear 30, including the retractable tethering device or mechanism 10 in which the retractable tethering device or mechanism 10 is integrated with, magnetized to, incorporated with, within, upon, onto, into or attachable to the headgear 40.

In an embodiment, the apparatus further comprises attachable or detachable eyewear 30 allowing the mechanism thereof to be utilized to retain or store eyewear 30 within, upon, about, or adjacent to, the headgear 40 by a retractable tethering device or mechanism 10 simultaneously attached to, with, within, upon, onto, into, or between the eyewear 30 and headgear 40, headgear components, head covering or other location integrated with, within, upon, onto, into or attachable to the headgear 40. In an embodiment, the apparatus can be used to provide continual or intermittent attachment to and between eyewear 30 and/or eyewear elements, and headgear and/or headgear elements as eyewear 30 is moved back and forth from a position covering the eyes to a position upon, within, onto, into, or about the head, headgear 40, headgear component, head covering, or other location integrated with, within, upon, onto, into, or attachable to the headgear 40.

An embodiment of the disclosure may comprise an, adjustable, attachable, detachable, magnetic or permanent retractable mechanism that connects to, between, tethers 50 or integrates headgear 40 and/or headgear components with eyewear 30 and/or eyewear components that maintains tension between the eyewear 30 elements and headgear elements while connected between the eyewear 30 and/or eyewear components and the headgear 40 and/or headgear components.

An embodiment of the disclosure may comprise headgear designed to or that includes or allows the integration with or attachment to an adjustable, attachable, detachable, retractable or magnetic mechanism that combines and/or integrates eyewear 30 and/or eyewear components and elements and headgear 40, headgear components, elements, head covering or other location integrated with, within, upon, onto, into, or attachable to the headgear 40.

An embodiment of the disclosure may comprise eyewear 30 designed to or that includes or allows integration with an adjustable, attachable, detachable, retractable or magnetic mechanisms that combines, connects and/or integrates eyewear 30 or eyewear components with headgear 40 and/or headgear components.

An embodiment of the disclosure may comprise an attachment mechanism that allows eyewear 30 to be connected to and/or integrated with retractable tethering device(s) 10 or magnetic components 520 and 521 attachable and detachable to and from headgear 40.

An embodiment of the disclosure may comprise an attachment mechanism that allows headgear 40 to be connected to and/or integrated with retractable tethering device(s) 10 or magnetic elements 520 and 521 attachable and detachable to and from eyewear 30.

An embodiment of the disclosure may comprise eyewear 30 attachable and detachable to, or integrated with, a retractable tethering device or mechanism 10 attachable or detachable to headgear 40.

An embodiment of the disclosure may comprise headgear attachable and detachable to or integrated with a retractable tethering device or mechanism 10 attachable or detachable to eyewear 30.

An embodiment of the disclosure may comprise eyewear 30 magnetically attachable or detachable to and from headgear 40.

An embodiment of the disclosure may comprise headgear 40 is magnetically attachable or detachable to and from eyewear 30.

An embodiment of the disclosure may comprise eyewear 30 or eyewear components that allow adjustment of the lens angle 130, or lens to temple angle 120.

An embodiment of the disclosure may comprise an attachment mechanism for connecting eyewear 30 with headgear 40 and headgear 40 with eyewear 30 comprising a swivel device (i.e., swiveling or rotating or revolving mechanism) 401 that allows the attachment to reside above, below, behind, adjacent to underneath, beside, inside, outside, or within the eyewear temple 70, ear piece 80, or other eyewear component as the eyewear 30 is moved from a position in front of the eyes to a position residing upon, in, within, adjacent to, or about the headgear 40.

An embodiment of the disclosure may comprise an attachment mechanism for connecting eyewear 30 with headgear and headgear with eyewear 30 that allow attachment to, extension of, and adjustment of, or to manipulate the distance between the eyewear 30 lens and the eyes, the length of eyewear temple 70, lens angle 130, earpiece 80 or other eyewear component, length of tethering device attachment mechanism, and/or the angle between the lens and temple 120 in the plane perpendicular or parallel to the eyewear temple 70 or other eyewear component.

An embodiment of the disclosure may comprise an attachment mechanism for connecting eyewear 30 with headgear 40 and headgear 40 with eyewear 30 comprising clips, snaps, pins, screw mechanisms, swivels, nuts, bolts, clamps, compression-based mechanisms, ball and socket connectors, magnets, friction-based, gears, zippers, plugs, hook and loop, hook and eye, hooks, hoops, springs and spring-loaded devices, ties, knots, winding mechanisms, tongue and groove, glue, adhesives, tape, embroidery, welds, or other connection that facilitate the attachment and connection between eyewear 30 and headgear 40 allowing the eyewear 30 to be moved to and from a position in front of the eyes to a position residing upon, in, within, or about, adjacent to, and connected to the headgear 40.

An embodiment of the disclosure may comprise a method comprising attaching and/or integrating eyewear 30 to an extendable, retractable tethering device or mechanism 10 attachable or detachable to headgear 40.

An embodiment of the disclosure may comprise a method comprising attaching and/or integrating an extendable retractable tethering device or mechanism to eyewear 30 and headgear 40.

What is claimed is:

1. A headgear and eyewear system comprising:
   eyewear configured to be worn by a user, wherein the eyewear comprises a user adjustable lens-temple angle;
   headgear configured to be worn by the user; and
   at least one retaining mechanism configured to removably attach the eyewear to the headgear via a tensioned interaction between the eyewear and the retaining mechanism, wherein the eyewear can be in a first position, wherein the first position allows a lens of the eyewear to affect a field of view of the user, wherein the adjustable lens-temple angle allows the eyewear to rest at various user-selected areas upon user's nose while a temple of the eyewear remains at a location, wherein the eyewear can be in a second position upon the headgear, wherein the second position allows a lens of the eyewear to not affect a field of view of the user, and wherein the retaining mechanism is configured to retain the eyewear with respect to the headgear in at least one of the first position and the second position.

2. The system of claim 1, wherein the retaining mechanism comprises:
   a retractable tethering device attached to the headgear, configured to maintain a connection between the headgear and the eyewear; and
   an attachment mechanism attached to the eyewear configured to attach to at least a portion of the retractable tethering device to the eyewear.

3. The retaining mechanism of claim 2, wherein the retractable tethering device comprises spring-loaded tension configured to maintain the eyewear in place in the first position and in the second position.

4. The retaining mechanism of claim 2, wherein the retractable tethering device comprises one or more tethers configured to pass through one or more portals from an exterior of the headgear to an interior of the headgear.

5. The retaining mechanism of claim 2, wherein the attachment mechanism comprises one or more balls attached to the retractable tethering device, and one or more sockets incorporated into the eyewear.

6. The retaining mechanism of claim 2, wherein the attachment mechanism comprises a swivel device connecting the retractable tethering device to a portion of the eyewear, wherein the swivel device allows the retractable tethering device to rotate above and below the eyewear when the eyewear is moved between the first position and the second position.

7. A retaining mechanism configured to removably attach to eyewear and headgear, wherein the eyewear comprises a user adjustable lens-temple angle, the retaining mechanism comprising:
   a retractable tethering device attached to the headgear, configured to maintain a connection between the headgear and the eyewear via a tensioned interaction between the eyewear and the retaining mechanism; and
   an attachment mechanism attached to a temple portion of the eyewear and configured to attach to at least a portion of the retractable tethering device, wherein the eyewear can be in a first position and wherein the first position is further user adjustable via user manipulation of the adjustable lens-temple angle, wherein the first position allows a lens of the eyewear to affect a field of view of a user, wherein the adjustable lens-temple angle allows the eyewear to rest at various user-selected areas upon user's nose while a temple of the eyewear remains at a location, wherein the eyewear can be in a second position upon the headgear, wherein the second position allows a lens of the eyewear to not affect a field of view of the user, and wherein the retaining mechanism is configured to retain the eyewear with respect to the headgear in at least one of the first position and the second position.

8. The retaining mechanism of claim 7, wherein the retractable tethering device comprises spring-loaded tension configured to maintain the eyewear in place in the first position and in the second position.

9. The retaining mechanism of claim 7, wherein the retractable tethering device comprises one or more tethers configured to pass through one or more portals from an exterior of the headgear to an interior of the headgear.

10. The retaining mechanism of claim 7, wherein the attachment mechanism comprises one or more balls attached to the retractable tethering device, and one or more sockets incorporated into the eyewear.

11. The retaining mechanism of claim 10, wherein the attachment mechanism comprises a plurality of sockets along a temple portion of the eyewear and wherein the one or more balls may be attached to one of the plurality of sockets.

12. The retaining mechanism of claim 7, wherein the attachment mechanism comprises a swivel device connecting the retractable tethering device to a portion of the eyewear, wherein the swivel device allows the retractable tethering device to rotate above and below the eyewear when the eyewear is moved between the first position and the second position.

13. A method for retaining removably attachable eyewear with respect to headgear, the method comprising:

attaching a retaining mechanism to at least one of the headgear and the eyewear, wherein the eyewear comprises a user adjustable lens-temple angle;

incorporating an attachment mechanism of the retaining mechanism into the headgear and the eyewear; and retaining the eyewear with respect to the headgear via a tensioned interaction between the eyewear and the retaining mechanism when the eyewear is in at least one of a first position and a second position, wherein the first position allows a lens of the eyewear to affect a field of view of the user and wherein the first position is further user adjustable via user manipulation of the adjustable lens-temple angle, wherein the adjustable lens-temple angle allows the eyewear to rest at various user-selected areas upon user's nose while a temple of the eyewear remains at a location, and wherein the second position allows a lens of the eyewear to not affect a field of view of the user.

14. The method of claim 13, wherein attaching the retaining mechanism comprises attaching a retractable tethering device to the headgear, wherein the retractable tethering device is configured to maintain a connection between the headgear and the eyewear, wherein the attachment mechanism is incorporated into the eyewear, and wherein the attachment mechanism is configured to attach to at least a portion of the retractable tethering device.

* * * * *